(12) United States Patent
Tseng

(10) Patent No.: US 11,195,083 B2
(45) Date of Patent: Dec. 7, 2021

(54) OBJECT DETECTION SYSTEM AND OBJECT DETECTION METHOD

(71) Applicant: PEGATRON CORPORATION, Taipei (TW)

(72) Inventor: Yu-Hung Tseng, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 58 days.

(21) Appl. No.: 16/898,552

(22) Filed: Jun. 11, 2020

(65) Prior Publication Data

US 2020/0401871 A1 Dec. 24, 2020

(30) Foreign Application Priority Data

Jun. 20, 2019 (TW) ................................ 108121565

(51) Int. Cl.
*G06K 9/46* (2006.01)
*G06N 3/04* (2006.01)
(Continued)

(52) U.S. Cl.
CPC ......... *G06N 3/0454* (2013.01); *G06K 9/4628* (2013.01); *G06K 9/6256* (2013.01);
(Continued)

(58) Field of Classification Search
CPC .......... G06K 9/00308; G06K 9/00926; G06K 9/3233; G06K 9/4671; G06K 9/6215; G06K 9/6228; G06K 9/6262; G06K 9/627; G06K 9/6276; G06K 9/629; G06K 9/00261; G06K 9/00288; G06K 9/00228; G06K 9/00268; G06K 9/00281; G06K 9/6202;
(Continued)

(56) References Cited

U.S. PATENT DOCUMENTS

2018/0189595 A1 7/2018 Fang et al.
2019/0035117 A1\* 1/2019 Xing ....................... G06T 5/002
(Continued)

FOREIGN PATENT DOCUMENTS

| CN | 107342810 A | 11/2017 |
|---|---|---|
| CN | 108520219 A | 9/2018 |
| CN | 108537824 A | 9/2018 |

*Primary Examiner* — Quan M Hua
(74) *Attorney, Agent, or Firm* — McClure, Qualey & Rodack, LLP

(57) ABSTRACT

An object detection system includes an image capture device, a memory, and a processor. The image capture device captures an image. The memory stores an instruction corresponding to an inference engine based on a multi-scale convolutional neural network architecture including a first, a second, and an object detection scale. The processor executes the instruction to: reduce network widths of convolution layers of the second scale; run the inference engine according to the adjusted convolutional neural network architecture to receive the image as an initial input; input a first output generated by the first scale according to the initial input into the second and the object detection scale; input a second output generated by the second scale according to the first output into the object detection scale; generate a final output according to the first and the second output by the object detection scale, to perform object detection on the image.

18 Claims, 6 Drawing Sheets

(51) Int. Cl.
  *G06N 3/08*     (2006.01)
  *G06K 9/62*     (2006.01)
  *G06T 7/246*    (2017.01)

(52) U.S. Cl.
  CPC ............ *G06N 3/082* (2013.01); *G06T 7/246* (2017.01); *G06T 2207/20081* (2013.01); *G06T 2207/20084* (2013.01)

(58) Field of Classification Search
  CPC ....... G06K 2009/4666; G06K 9/00362; G06K 9/4642; G06K 9/6206; G06K 9/6255; G06K 9/6256; G06K 9/00275; G06N 3/0454; G06N 3/084; G06N 3/08; G06T 11/00; G06T 2207/10016; G06T 2207/10024; G06T 2207/20081; G06T 2207/30201; G06T 2207/30241; G06T 2207/30244; G06T 7/251; G06T 7/74; G06T 7/80
  See application file for complete search history.

(56) References Cited

U.S. PATENT DOCUMENTS

2019/0057507 A1\* 2/2019 El-Khamy ................ G06T 7/11
2019/0073780 A1\* 3/2019 Iwase ..................... G06T 7/337

\* cited by examiner

OBJECT DETECTION SYSTEM AND OBJECT DETECTION METHOD

CROSS-REFERENCE TO RELATED APPLICATION

This application claims the priority benefit of Taiwan application serial no. 108121565, filed on Jun. 20, 2019. The entirety of the above-mentioned patent application is hereby incorporated by reference herein and made a part of this specification.

BACKGROUND

Technical Field

The present disclosure relates to an object detection system and an object detection method, and in particular, to an object detection system and an object detection method that are based on a convolutional neural network architecture.

Description of Related Art

It is generally known that neural networks need massive data operations. In the prior art, an additional graphics processing unit (GPU) or another type of acceleration device such as a field-programmable gate array (FPGA) may be configured in a computer at a data center. An edge device may then be communicatively coupled to the computer at the data center by using a network communication technology (for example, wireless fidelity (Wi-Fi) and Ethernet) and transmit an image to the data center. The computer at the data center may perform an operation according to the neural network and return a result to the edge device. In such a system configuration, the edge device does not obtain an operation result at a satisfactory speed and is not adequate to meet requirements of various application programs.

SUMMARY

To resolve the foregoing problem, the present disclosure provides the following implementation aspects to adequately run an object detection program on an edge device.

An implementation aspect of the present disclosure relates to an object detection system. The object detection system includes at least an image capture device, a memory, and a processor. The memory and the image capture device are coupled to the processor. The image capture device is configured to capture an image. The memory is configured to store at least one instruction corresponding to an inference engine. The inference engine is based on a convolutional neural network architecture having multiple scales. The multiple scales of the convolutional neural network architecture include a first scale receiving an initial input, a second scale connected to the first scale, and an object detection scale connected to the second scale. A plurality of first convolution layers of the first scale corresponds to a first network width, and a plurality of second convolution layers of the second scale corresponds to a second network width. The processor is configured to access the at least one instruction from the memory and execute the at least one instruction to perform the following steps: adjusting the convolutional neural network architecture to reduce the second network width of the second convolution layers; running the inference engine according to the adjusted convolutional neural network architecture, to enable the first scale to receive the image, where the image is the initial input; generating a first output according to the initial input by the first scale, and inputting the first output into the second scale and the object detection scale; generating a second output according to the first output by the second scale, and inputting the second output into the object detection scale; and generating a final output according to the first output and the second output by the object detection scale, to perform object detection on the image.

Another implementation aspect of the present disclosure relates to an object detection method. The object detection method is performed by a processor. The object detection method includes at least the following steps: accessing at least one instruction corresponding to an inference engine, where the inference engine is based on a convolutional neural network architecture having multiple scales, the multiple scales of the convolutional neural network architecture include a first scale receiving an initial input, a second scale connected to the first scale, and an object detection scale connected to the second scale, a plurality of first convolution layers of the first scale corresponds to a first network width, and a plurality of second convolution layers of the second scale corresponds to a second network width; adjusting the convolutional neural network architecture to reduce the second network width of the second convolution layers; running the inference engine according to the adjusted convolutional neural network architecture, to enable the first scale to receive an image, where the image is the initial input; generating a first output according to the initial input by the first scale, and inputting the first output into the second scale and the object detection scale; generating a second output according to the first output by the second scale, and inputting the second output into the object detection scale; and generating a final output according to the first output and the second output by the object detection scale, to perform object detection on the image.

Therefore, according to the foregoing implementation aspects of the present disclosure, the present disclosure provides at least an object detection system and an object detection method that can maintain detection accuracy while increasing the operation speed.

BRIEF DESCRIPTION OF THE DRAWINGS

The content of the present disclosure may be better understood with reference to the embodiments in the subsequent paragraphs and the following accompanying drawings.

DETAILED DESCRIPTION

The spirit of the present disclosure is clearly described below with reference to the accompanying drawings and detailed description. After learning about the embodiments of the present disclosure, any person of ordinary skill in the art may make changes and modifications to the technologies taught in the present disclosure without departing from the spirit and scope of the present disclosure.

"Comprise", "include", "have", and the like used in the specification are all open terms which indicate "include, but not limited to".

Unless otherwise noted, the terms used in the specification usually have ordinary meanings of each term used in the field, in the content of the present disclosure, and in particular content. Some terms used for describing the present disclosure are discussed below or somewhere in the specification, to provide additional guidance in the description of the present disclosure to a person skilled in the art.

Figure 1:
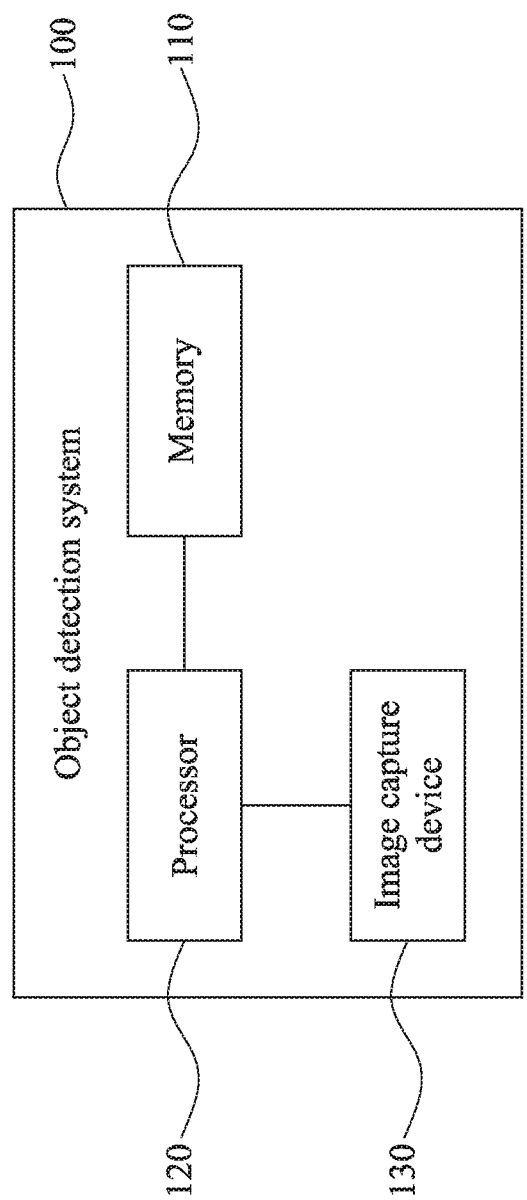
FIG. 1 is a schematic diagram of an object detection system according to some embodiments of the present disclosure.

FIG. 1 is a schematic diagram of an object detection system according to some embodiments of the present disclosure. As shown in FIG. 1, in some embodiments, an object detection system 100 includes a memory 110 and a processor 120. The memory 110 is electrically/communicatively coupled to the processor 120. In some other embodiments, the object detection system 100 further includes an image capture device 130. The image capture device 130 is electrically/communicatively coupled to the processor 120.

In some embodiments, the memory 110, the processor 120, and the image capture device 130 in the object detection system 100 may be disposed together in the same position to form an edge device that can operate independently. In some embodiments, the image capture device 130 of the object detection system 100 is mainly configured to capture an image (or a continuous image stream), so that the processor 120 may process the image captured by the image capture device 130 according to an instruction stored in the memory, to implement the function of the object detection system 100.

It should be understood that, the "electrical coupling" or "communicative coupling" in the present disclosure may be a physical or non-physical coupling. For example, in some embodiments, the processor 120 may be coupled to the memory 110 by using a wireless communication technology. In this way, the processor 120 and the memory 110 may exchange information bidirectionally. In some embodiments, the memory 110 and the processor 120 may be coupled by a physical line. In this way, the processor 120 and the memory 110 may also exchange information bidirectionally. The coupling in all the foregoing embodiments may be referred to as an "electrical coupling" or "communicative coupling".

In some embodiments, the memory 110 may include, but not limited to, one or a combination of a flash memory, a hard disk drive (HDD), a solid state disk (SSD), a dynamic random access memory (DRAM) or a static random access memory (SRAM). In some embodiments, as a non-transient computer-readable medium, the memory 110 may further store at least one computer-readable instruction. The at least one computer-readable instruction may be accessed by the processor 120. The processor 120 may execute the at least one computer-readable instruction to run an application program, so as to implement the function of the object detection system 100.

In some embodiments, the processor 120 may include, but not limited to, a single processor or an integration of a plurality of microprocessors, for example, a central processing unit (CPU), a GPU, an application-specific integrated circuit (ASIC). Based on the foregoing, in some embodiments, the processor 120 may be configured to access the at least one computer-readable instruction from the memory 110 and execute the at least one computer-readable instruction, so as to run the application program, thereby implementing the function of the object detection system 100.

In some embodiments, the image capture device 130 may include, but not limited to, an optical camera for general use, an infrared camera, a depth camera, and a rostrum camera. In some embodiments, the image capture device 130 is a device that can operate independently and can capture and store an image stream independently. In some embodiments, the image capture device 130 may capture an image stream and store the image stream in the memory 110. In some embodiments, the image capture device 130 may capture an image stream, and the image stream is processed by the processor 120 before being stored in the memory 110.

For better understanding of the present disclosure, the content of the application program run by the processor 120 is described in detail in the following paragraphs.

Figure 2:
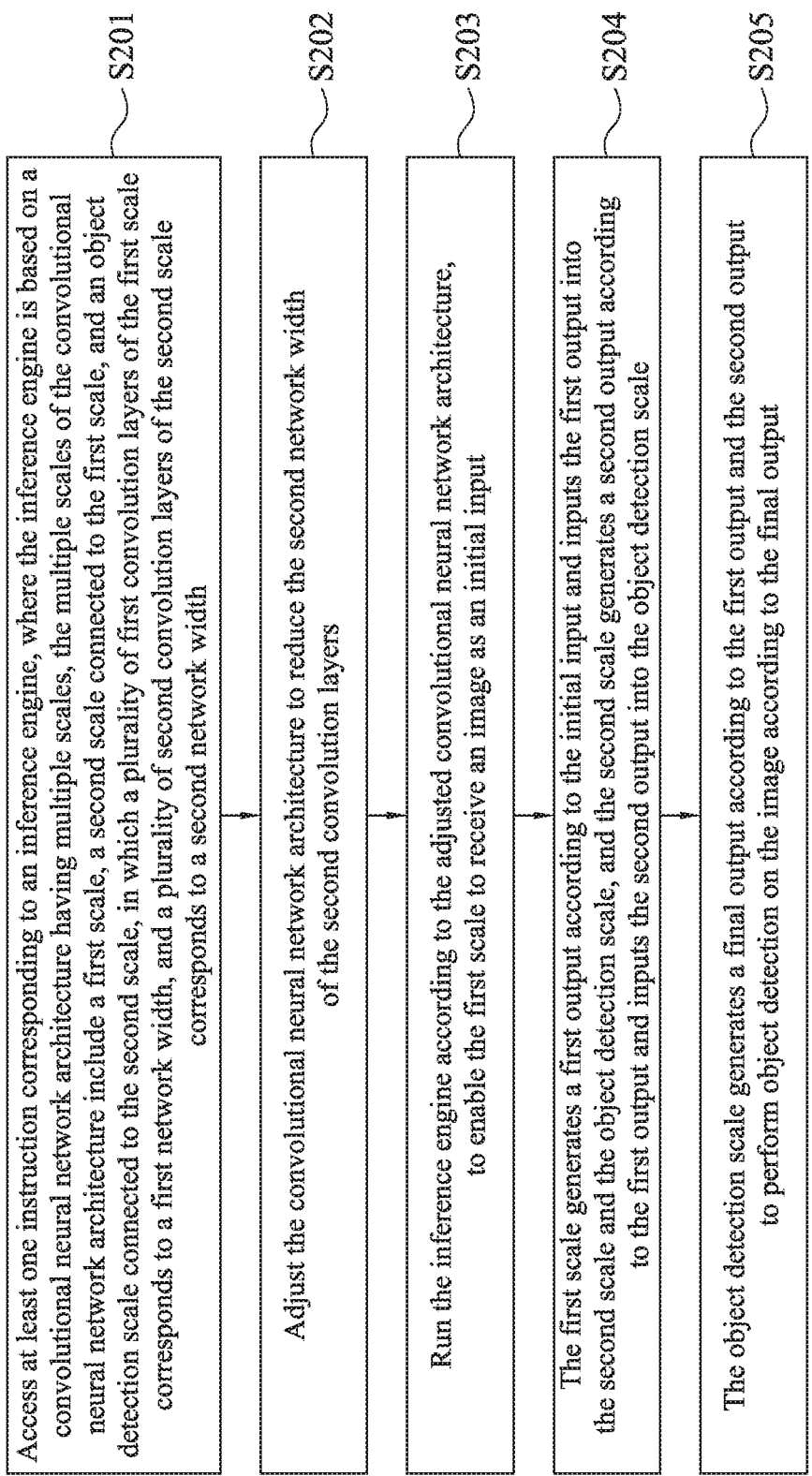
FIG. 2 is a flowchart of an object detection method according to some embodiments of the present disclosure.

FIG. 2 is a flowchart of an object detection method according to some embodiments of the present disclosure. As shown in FIG. 2, in some embodiments, an object detection method 200 is implemented by using the processor 120 of the object detection system 100 in FIG. 1. For better understanding of the following embodiments, refer to the embodiment in FIG. 1 together, to understand the operation of units in the object detection system 100.

Specifically, the object detection method 200 shown in FIG. 2 is the application program described in the embodiment in FIG. 1, and is operated by a processor 120 by accessing at least one computer-readable instruction from a memory 110 and executing the at least one computer-readable instruction. In some embodiments, detailed steps of the object detection method 200 are as follows:

S201: Access at least one instruction corresponding to an inference engine, where the inference engine is based on a convolutional neural network architecture having multiple scales, the multiple scales of the convolutional neural network architecture include a first scale, a second scale connected to the first scale, and an object detection scale connected to the second scale, in which a plurality of first convolution layers of the first scale corresponds to a first network width, and a plurality of second convolution layers of the second scale corresponds to a second network width.

In some embodiments, the processor 120 may execute at least one computer-readable instruction to run an inference engine based on a convolutional neural network architecture. In some embodiments, the inference engine is an object detection program, and the function of the inference engine is to perform object detection on a specific object in an image.

Figure 3:
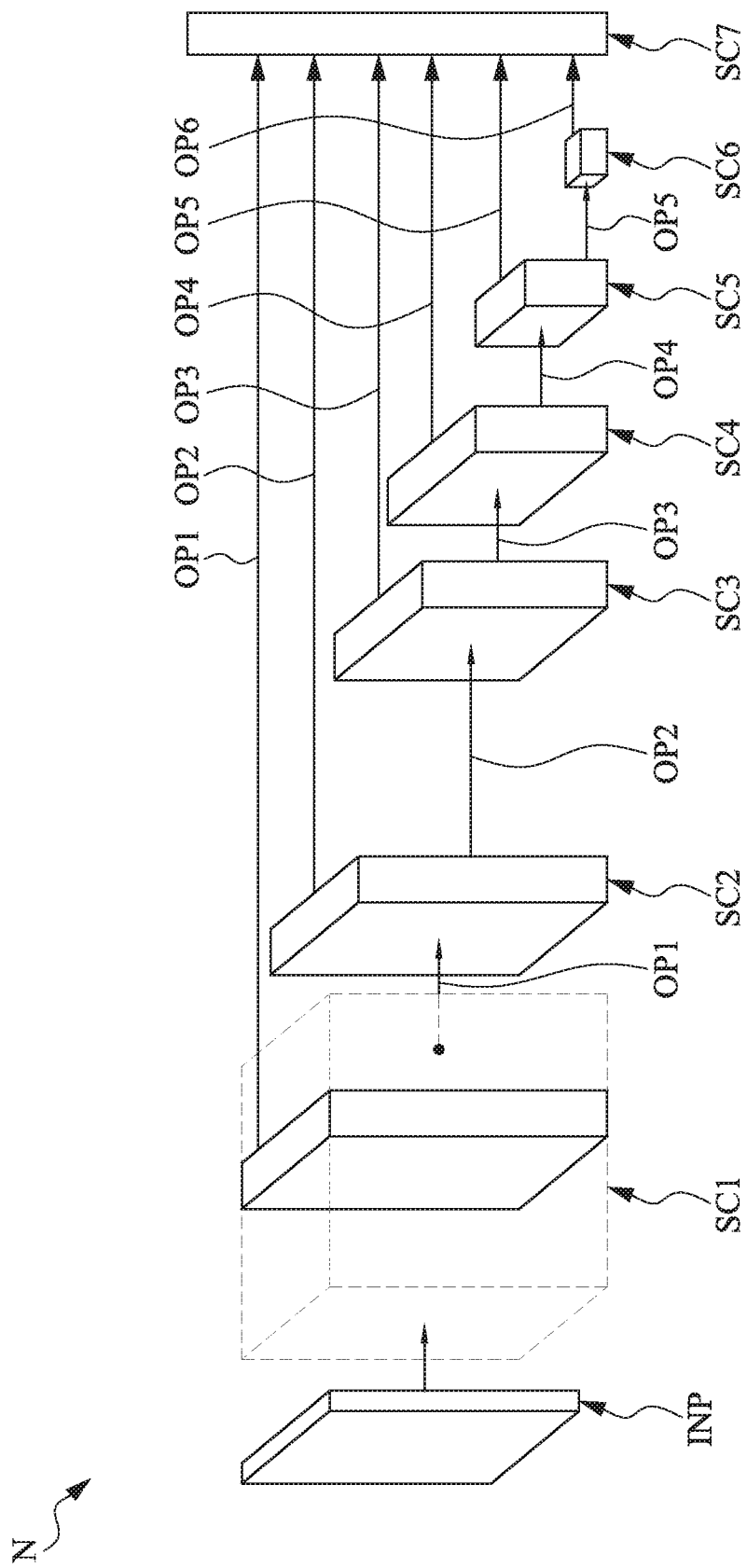
FIG. 3 is a schematic diagram of a convolutional neural network architecture according to some embodiments of the present disclosure.

For better understanding, FIG. 3 is a schematic diagram of a convolutional neural network architecture according to some embodiments of the present disclosure. FIG. 3 shows a convolutional neural network architecture N having multiple scales. In some embodiments, the convolutional neural network architecture N includes at least scales SC1 to SC6 and an object detection scale SC7. It should be noted that, the convolutional neural network architecture in the present disclosure is not limited thereto.

In some embodiments, each of the scales SC1 to SC6 may include a plurality of operation layers, for example, convolution layers. In some embodiments, alternatively, the scales SC1 to SC6 may selectively include a pooling layer or an activation function as required.

In some embodiments, each convolution layer may perform a convolution on an input value according to a filter having a specific shape. A result of the convolution is an output value of the convolution layer. It should be noted that, the filter shape of each convolution layer may be understood as performing operation on the input value of the layer in different manners of feature extraction. It should be understood that, the convolution layers included in the scales SC1 to SC6 may have the same filter shape or different filter shapes, so that each convolution layer has the same network width or different network widths. A designer of the convolutional neural network architecture N may determine the filter shape of each convolution layer as required, to control the network widths of the convolution layers.

As shown in FIG. 3, in some embodiments, the scale SC1 may be configured to receive an initial input INP. An output value OP1 is generated after the convolution is performed on the initial input INP in the scale SC1. The output value OP1 is input into the scale SC2 as an input value of the scale SC2. An output value OP2 is generated after the convolution is performed on the output value OP1 in the scale SC2. The output value OP2 is input into the scale SC3 as an input value of the scale SC3. The remaining output values OP3 to OP6 are all generated in a manner same as that described above. Details are not described herein again.

In some embodiments, the initial input INP may be information related to an image. The information of the image may include a red-green-blue (RGB) value, depth information, and a non-visible light value.

In some embodiments, the dimension of the image is 224*224*3, in which the values are respectively used for representing a length, a width, and a quantity of channels. The length and width of the image can represent the resolution of the image. The quantity of channels of the image corresponds to an eigenvalue of the image, for example, the RGB value of the image. In this embodiment, the network width is used for representing the eigenvalue of the image subsequently. If the filter shape used in a first convolution layer of the scale SC1 is 3*3*3*64 and the network width of the convolution layer is 64, the dimension of the output value obtained after the convolution is performed on the image in the convolution layer is 112*112*64. It can be learned that, after the convolution is performed on the input value in the convolution layer, the first two values of the output value decrease (that is, the resolution decreases), whereas the width increases. That is, if the output values OP1 to OP6 sequentially generated by the scales SC1 to SC6 are understood as images, the resolutions of the output values OP1 to OP6 decrease sequentially, and the output value OP6 has the smallest resolution.

In some embodiments, according to the same network width or different network widths corresponding to the convolution layers in the convolutional neural network architecture N, the dimensions of the output values of the convolution layers may be the same or different. As shown in FIG. 3, the network widths of the convolution layers in the scales SC1 to SC6 are approximately arranged in ascending order (for example, 3, 32, 64, 128, 256, 512, 1024, . . . ). Some consecutive convolution layers included in the scales SC1 to SC6 may have the same network width (for example, the network widths are sequentially 3, 32, 32, 64, 64, 128, 128, 128, 128, 256, 256, . . . ). That is, the network width of the convolution layer in the scale SC1 is less than the network width of the convolution layer in the scale SC2. The network width of the convolution layer in the scale SC2 is less than the network width of the convolution layer in the scale SC3. The network widths in the remaining scales may be deduced by analogy. Details are not described herein again.

It should be noted that, as shown in FIG. 3, in addition to being directly input into a next scale, the output values OP1 to OP5 respectively generated by the scales SC1 to SC5 are also directly input into the object detection scale SC7. Therefore, the convolutional neural network architecture N in FIG. 3 is a single shot multi-box detector (SSD). In some embodiments, the convolutional neural network architecture N shown in FIG. 3 may be implemented by using a Mobile-Net frame or a Resnext frame. However, the present disclosure is not limited thereto.

S202: Adjust the convolutional neural network architecture to reduce the second network width of the second convolution layers.

It should be understood that, an experimental result of object detection performed by using the convolutional neural network architecture N shows that, if the overall network width of the convolutional neural network architecture N is reduced, the operation speed of the object detection can be effectively increased. However, the experimental result also shows that, if the overall network width of the convolutional neural network architecture N is reduced, detection accuracy is consequently decreased.

The experimental result further shows that, when the convolutional neural network architecture N is used for detecting an object having a relatively small dimension in the image, the network width of a shallow scale (that is, a scale relatively close to the initial input) in the convolutional neural network architecture N greatly affects the detection accuracy. For example, when the convolutional neural network architecture shown in FIG. 3 is used for detecting an object having a relatively small dimension in the image, the network width of the scale SC1 has the greatest impact on the overall detection accuracy. It should be noted that, the "relatively small" dimension of an object herein indicates that, compared with the proportion of another object in the image, the proportion (for example, a pixel proportion) of the object in the image has a lower value.

Figure 4:
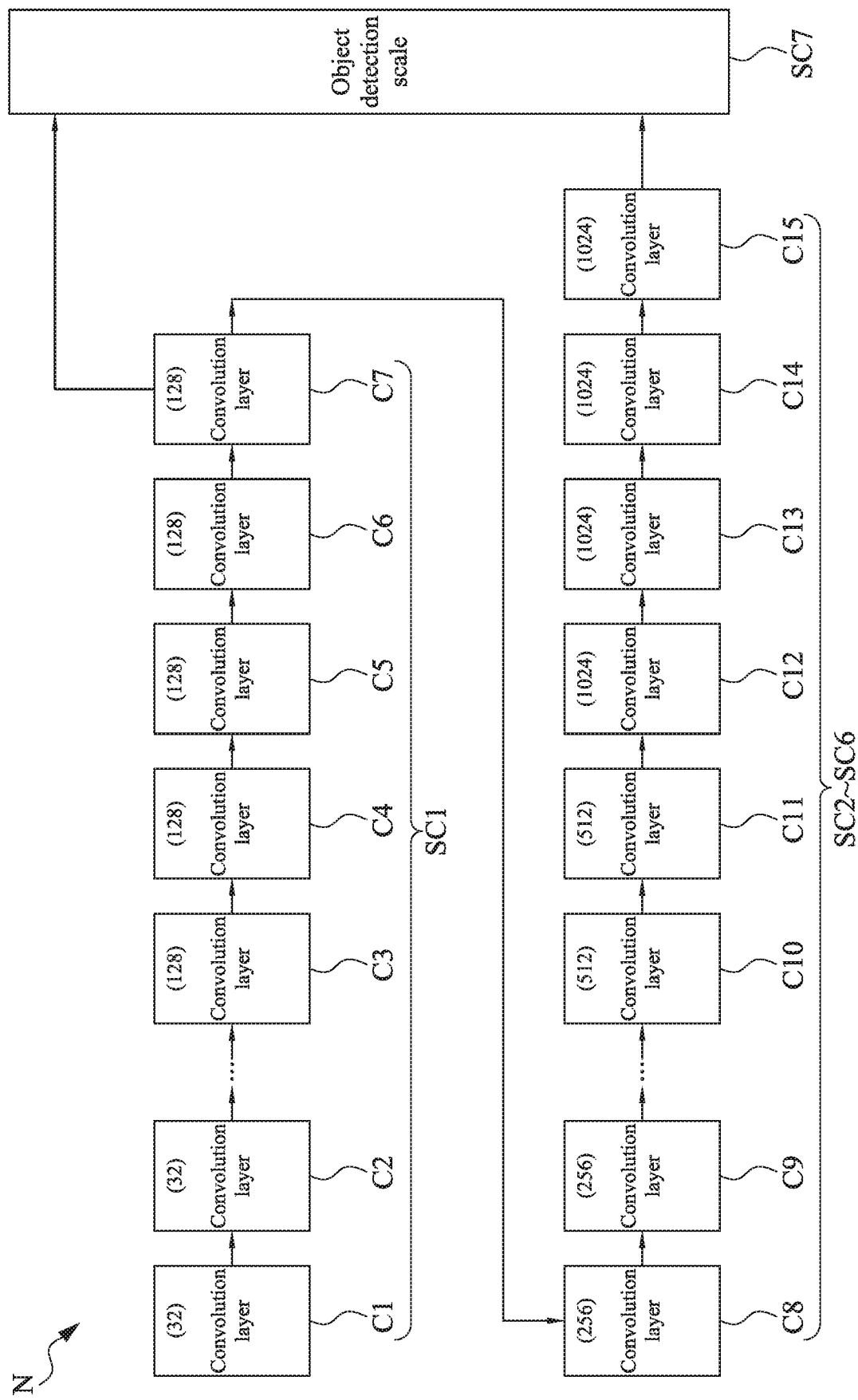
FIG. 4 is a partial schematic diagram of a convolutional neural network architecture according to some embodiments of the present disclosure.

For better understanding of the present disclosure, FIG. 4 is a partial schematic diagram of a convolutional neural network architecture according to some embodiments of the present disclosure. In some embodiments, the scale SC1 of the convolutional neural network architecture N may include a plurality of convolution layers C1 to C7 having different network widths, and the scales SC2 to SC6 of the convolutional neural network architecture N may include convolution layers C8 to C15. It should be noted that, the convolution layers C1 to C15 shown in FIG. 4 are not all the convolution layers of the convolutional neural network architecture N. The scales SC1 to SC6 may further include a plurality of convolution layers having different network widths. The convolution layers are only omitted in the figure.

As shown in FIG. 4, in some embodiments, the network widths of the convolution layers C1 and C2 in the scale SC1 are 32, and the network widths of the convolution layers C3 to C7 are 128. It should be understood that, some convolution layers having the network width of 64 may be omitted between the convolution layer C2 and the convolution layer C3. In some embodiments, the network widths of the convolution layers C8 and C9 in the scales SC2 to SC6 are 256, the network widths of the convolution layers C10 and C11 are 512, and the network widths of the convolution layers C12 to C15 are 1024. It should be understood that, some convolution layers having the network widths of 256 and 512 may be omitted between the convolution layer C9 and the convolution layer C10. It can be learned that, the network width of the convolutional neural network architecture N gradually increases from the scale SC1 to the scale SC6. Based on the foregoing, the convolutional neural network architecture N is an SSD, and the convolution layer C7 is the last operation layer of the scale SC1. Therefore, the output value of the convolution layer C7 is simultaneously input into the first convolution layer C8 of the scale SC2 and the object detection scale SC7.

In some embodiments, the processor 120 may adjust the network widths corresponding to the plurality of convolution layers in the scales SC1 to SC6 according to at least two policies, to increase the detection intensity of a small object at a relatively high operation speed, thereby increasing the overall detection accuracy.

Policy 1: Generally reduce the network widths of the convolution layers in the scales SC2 to SC6 (i.e., reduce the network widths of the second convolution layers), but maintain the network width of the scale SC1. For better understanding of the present disclosure, FIG. 5 is a partial schematic diagram of a convolutional neural network architecture according to some embodiments of the present disclosure.

Figure 5:
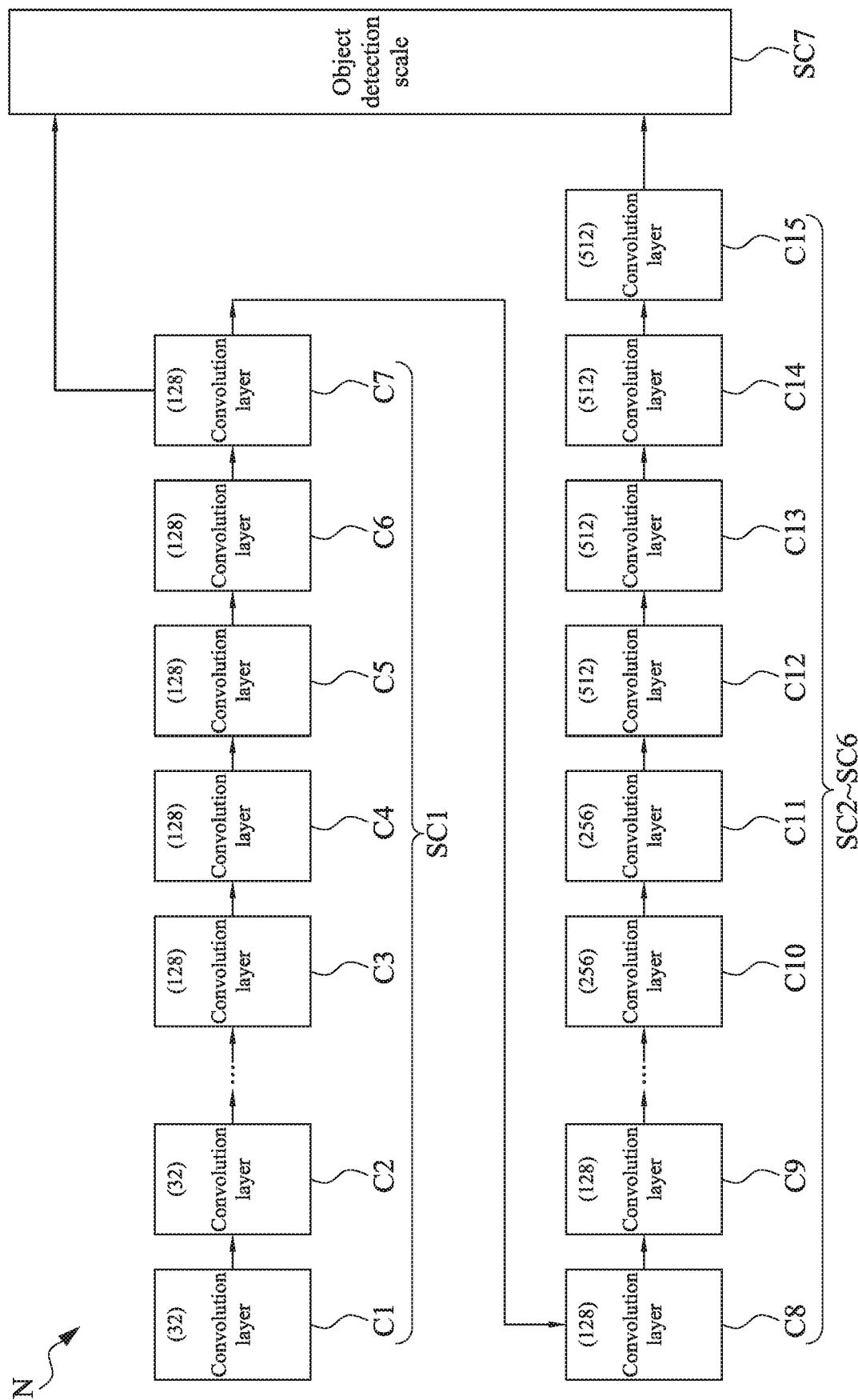
FIG. 5 is a partial schematic diagram of a convolutional neural network architecture according to some embodiments of the present disclosure.

As shown in FIG. 5, in some embodiments, compared with the embodiment in FIG. 4, the processor 120 maintains the network widths of the convolution layers C1 and C2 at 32, maintains the network widths of the convolution layers C3 to C7 at 128, reduces the network widths of the convolution layers C8 and C9 to 128, reduces the network widths of the convolution layers C10 and C11 to 256, and reduces the network widths of the convolution layers C12 to C15 to 512. Generally, compared with the embodiment in FIG. 4, the network widths of the scales SC2 to SC6 in the convolutional neural network architecture N are halved, and the network widths of the scale SC1 are maintained.

Policy 2: Generally reduce the network widths of the convolution layers in the scales SC1 to SC6, but increase the network width of the output value of the scale SC1 in the form of concatenation (i.e., reduce the network widths of the second convolution layers). For better understanding of the present disclosure, FIG. 6 is a partial schematic diagram of a convolutional neural network architecture according to some embodiments of the present disclosure.

Figure 6:
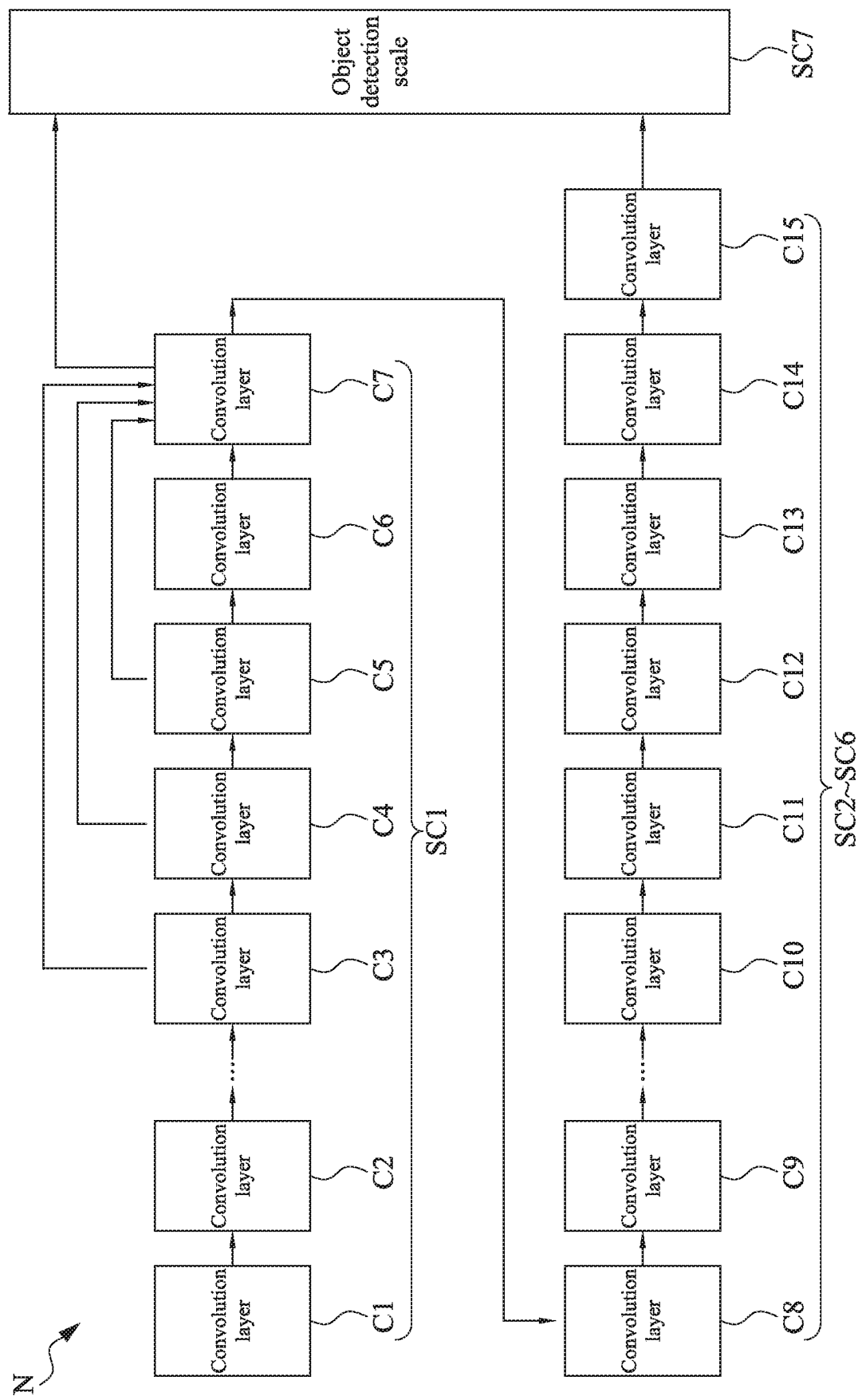
FIG. 6 is a partial schematic diagram of a convolutional neural network architecture according to some embodiments of the present disclosure.

As shown in FIG. 6, compared with the embodiment in FIG. 4, the processor 120 generally reduces the network widths of the scales SC1 to SC6, but increases the network width of at least one convolution layer in the scale SC1. In some embodiments, the processor 120 may reduce the network widths of the convolution layers C1 and C2 to 16, reduce the network widths of the convolution layers C3 to C6 to 64, and use an accumulated value of the output values of the convolution layers C3 to C6 as the output value of the convolution layer C7. Therefore, the network width of the convolution layer C7 is changed to 256 (that is, 64+64+64+64). Moreover, the processor 120 may reduce the network widths of the convolution layers C8 and C9 to 128, reduce the network widths of the convolution layers 010 and C11 to 256, and reduce the network widths of the convolution layers C12 to C15 to 512. Compared with the embodiment in FIG. 4, the network widths of the scales SC1 to SC6 in the convolutional neural network architecture N are generally halved, and only the network width of the convolution layer C7 in the scale SC1 is significantly increased.

In some embodiments, the processor 120 may adjust the scales SC1 to SC6 in the convolutional neural network architecture N according to at least one of the foregoing two policies, so that the network widths of the second convolution layers C8 to C15 of the scales SC2 to SC6 are reduced, but the network width of at least one convolution layer (for example, the convolution layer C7 of which the output value is output into the object detection scale SC7) in the scale SC1 is greater than that of the other convolution layers in the scales SC2 to SC6.

S203: Run the inference engine according to the adjusted convolutional neural network architecture, to enable the first scale to receive an image as an initial input.

In some embodiments, the processor 120 of the object detection system 100 may execute the at least one computer-readable instruction to run the inference engine based on the adjusted convolutional neural network architecture N. The inference engine may be configured to perform object detection on an image captured by an image capture device 130. Based on the foregoing, as shown in FIG. 3, when the inference engine is run, the image captured by the image capture device 130 may be used as the initial input INP, which is received by the scale SC1 of the convolutional neural network architecture N.

S204: The first scale generates a first output according to the initial input and inputs the first output into the second scale and the object detection scale, and the second scale generates a second output according to the first output and inputs the second output into the object detection scale.

In some embodiments, when the inference engine is run, the scale SC1 of the convolutional neural network architecture N receives the initial input INP, and the convolution layers in the scale SC1 performs a convolution. As shown in FIG. 5 and FIG. 6, the initial input INP is input into the convolution layer C1, and the convolution layers C2 to C15 sequentially performs a convolution on the output value of the convolution layer C1. As shown in FIG. 4, in addition to being directly input into the scale SC2, the output value OP1 generated by the scale SC1 is also directly input into the object detection scale SC7. Similarly, in addition to being directly input into a next scale, the output values OP2 to OP5 generated by the scales SC2 to SC5 are also directly input into the object detection scale SC7.

Specifically, the scale SC1 is considered as a first scale, and the scale SC2 is considered as a second scale. The scale SC1 (that is, the first scale) performs an operation to generate the output value OP1 according to the initial input INP, and the output value OP1 is input into the scale SC2 and the object detection scale SC7. The scale SC2 (that is, the second scale) performs an operation to generate the output value OP2 according to the output value OP1, and the output value OP2 is input into the scale SC3 and the object detection scale SC7. Similarly, each of the scales SC3 to SC6 performs an operation to generate a respective output according to an output of a previous scale, and the output is output into a next scale and the object detection scale SC7. The operation manner may be deduced by analogy.

S205: The object detection scale generates a final output according to the first output and the second output to perform object detection on the image according to the final output.

In some embodiments, the object detection scale SC7 of the convolutional neural network architecture N includes at least one fully-connected layer. It should be understood that, the object detection scale SC7 is mainly used for receiving the output values OP1 to OP6 of the scales SC1 to SC6 respectively, and performing operation according to the output values OP1 to OP6, to generate a corresponding object detection result.

It should be understood that, the inference engine runs by using the adjusted convolutional neural network architecture N has a relatively high operation speed, and the object detection accuracy is increased or maintained. Experiments show that a result of comparing a case in which the processor 120 runs the inference engine according to the unadjusted convolutional neural network architecture N with a case in which the processor 120 runs the inference engine according to the adjusted convolutional neural network architecture N is as follows: When the inference engine is run according to the unadjusted convolutional neural network architecture N, the processing time is 276 ms, and the detection accuracy is 63%. When the inference engine is run according to the convolutional neural network architecture N adjusted by using the policy 1, the processing time is 170 ms, and the detection accuracy is 70%. When the inference engine is run according to the convolutional neural network architecture N adjusted by using the policy 2, the processing time is 149 ms, and the detection accuracy is 63%. It can be learned from the experimental result that, when the inference engine is run according to the adjusted convolutional neural network architecture N, the operation speed significantly increases, and the detection accuracy is approximately greater than that of the unadjusted convolutional neural network architecture N.

In some embodiments, the image capture device 130 of the object detection system 100 may continuously capture images to generate an image stream. When the processor 120 runs the inference engine, each frame of the image stream may be consecutively input into the convolutional neural network architecture N as the initial input INP. The frames are received by the convolution layers C1 to C15 in the scales SC1 to SC6, and the corresponding object detection result is generated by the object detection scale SC7. In this case, the object detection system 100 may implement the function of "tracking" a specific object in the image stream.

It should be understood that, in the foregoing embodiments, the object detection system 100 in the present disclosure is provided with a plurality of functional blocks or modules. A person skilled in the art should understand that, in some embodiments, preferably, the functional blocks or modules may be implemented by using a specific circuit (a dedicated circuit or a general-purpose circuit that is included in one or more processors and that is operated by executing a coded instruction). Generally, the specific circuit may include a transistor or another circuit element, and is configured in a manner in the foregoing embodiments, so that the specific circuit may run according to the function and operation described in the present disclosure. Further, a coroutine between the functional blocks or modules in the specific circuit may be implemented by using a specific compiler, for example, a register transfer language (RTL) compiler. However, the present disclosure is not limited thereto.

It may be learned from the forgoing implementations of the present disclosure that, the embodiments of the present disclosure may be effectively run on an edge device by providing an object detection system and method and a non-transient computer-readable medium. When the inference engine is run by using the adjusted convolutional neural network architecture, the edge device can independently detect and track a specific object in an image and maintain the detection accuracy while increasing the operation speed.

Although the present disclosure is described in the embodiments above, the embodiments are not intended to limit the present disclosure. Any person skilled in the art may make various variations and modifications without departing from the spirit and scope of the present disclosure. Therefore, the protection scope of the present disclosure is defined by the appended claims.

What is claimed is:

1. An object detection system, comprising:
   an image capture device, configured to capture an image;
   a memory, configured to store at least one instruction corresponding to an inference engine, wherein the inference engine is based on a convolutional neural network architecture having multiple scales, the multiple scales of the convolutional neural network architecture comprises a first scale receiving an initial input, a second scale connected to the first scale, and an object detection scale connected to the second scale, a plurality of first convolution layers of the first scale corresponds to a first network width, and a plurality of second convolution layers of the second scale corresponds to a second network width; and
   a processor, coupled to the memory and the image capture device, wherein the processor is configured to access the at least one instruction from the memory and execute the at least one instruction to:
   adjust the convolutional neural network architecture to reduce the second network width of the plurality of second convolution layers;
   run the inference engine according to the adjusted convolutional neural network architecture, to enable the first scale to receive the initial input, wherein the initial input is information of the image;
   generate, a first output according to the initial input by the first scale, and input the first output into the second scale and the object detection scale;
   generate a second output according to the first output by the second scale, and input the second output into the object detection scale; and
   generate a final output according to the first output and the second output by the object detection scale, to perform object detection on the image.

2. The object detection system according to claim 1, wherein the multiple scales of the convolutional neural network architecture further comprise a third scale located between the second scale and the object detection scale, and the third scale generates a third output according to the second output of the second scale, and inputs the third output into the object detection scale, to enable the object detection scale generate the final output according to the first output, the second output, and the third output.

3. The object detection system according to claim 1, wherein the processor adjusting the convolutional neural network architecture to reduce the second network width of the plurality of second convolution layers is to halve the second network width.

4. The object detection system according to claim 1, wherein the processor is further configured to access the at least one instruction from the memory and execute the at least one instruction to:
   adjust the convolutional neural network architecture to reduce the first network width of the plurality of first convolution layers; and
   generate the first output by a final convolution layer of the plurality of first convolution layers, wherein the first output is a concatenated output of at least two of the plurality of first convolution layers, and the at least two of the plurality of first convolution layers are sequentially connected before the final convolution layer.

5. The object detection system according to claim 4, wherein the processor adjusting the convolutional neural network architecture to reduce the first network width is to halve the first network width.

6. The object detection system according to claim 4, wherein a quantity of the at least two of the plurality of first convolution layers is four.

7. The object detection system according to claim 1, wherein a first resolution of the first output is greater than a second resolution of the second output.

8. The object detection system according to claim 1, wherein the convolutional neural network architecture is a single shot multi-box detector (SSD).

9. The object detection system according to claim 1, wherein the information of the image comprises a red-green-blue (RGB) value, depth information, and a non-visible light value.

10. An object detection method, performed by a processor, and comprising:
 accessing at least one instruction corresponding to an inference engine, wherein the inference engine is based on a convolutional neural network architecture having multiple scales, the multiple scales of the convolutional neural network architecture comprise a first scale receiving an initial input, a second scale connected to the first scale, and an object detection scale connected to the second scale, a plurality of first convolution layers of the first scale corresponds to a first network width, and a plurality of second convolution layers of the second scale corresponds to a second network width;
 adjusting the convolutional neural network architecture to reduce the second network width of the plurality of second convolution layers;
 running the inference engine according to the adjusted convolutional neural network architecture, to enable the first scale to receive the initial input, wherein the initial input is information of an image;
 generating a first output according to the initial input by the first scale, and inputting the first output into the second scale and the object detection scale;
 generating a second output according to the first output by the second scale, and inputting the second output into the object detection scale; and
 generating a final output according to the first output and the second output by the object detection scale, to perform object detection on the image.

11. The object detection method according to claim 10, further comprising:
 adjusting the convolutional neural network architecture to reduce the first network width of the plurality of first convolution layers; and
 generating the first output by a final convolution layer of the plurality of first convolution layers, wherein the first output is a concatenated output of at least two of the plurality of first convolution layers, and the at least two of the plurality of first convolution layers are sequentially connected before the final convolution layer.

12. The object detection method according to claim 11, wherein the step of adjusting the convolutional neural network architecture to reduce the first network width of the plurality of first convolution layers is to halve the first network width.

13. The object detection method according to claim 11, wherein a quantity of the at least two of the plurality of first convolution layers is four.

14. The object detection method according to claim 10, wherein the multiple scales of the convolutional neural network architecture further comprise a third scale located between the second scale and the object detection scale, and the third scale generates a third output according to the second output of the second scale, and inputs the third output into the object detection scale, to enable the object detection scale generate the final output according to the first output, the second output, and the third output.

15. The object detection method according to claim 10, wherein the step of adjusting the convolutional neural network architecture to reduce the second network width of the plurality of second convolution layers is to halve the second network width.

16. The object detection method according to claim 10, wherein a first resolution of the first output is greater than a second resolution of the second output.

17. The object detection method according to claim 10, wherein the convolutional neural network architecture is a single shot multi-box detector (SSD).

18. The object detection method according to claim 10, wherein the information of the image comprises a red-green-blue (RGB) value, depth information, and a non-visible light value.

* * * * *